Dec. 15, 1936.  E. V. TAYLOR  2,064,575
BRAKE
Original Filed May 7, 1928  2 Sheets-Sheet 1
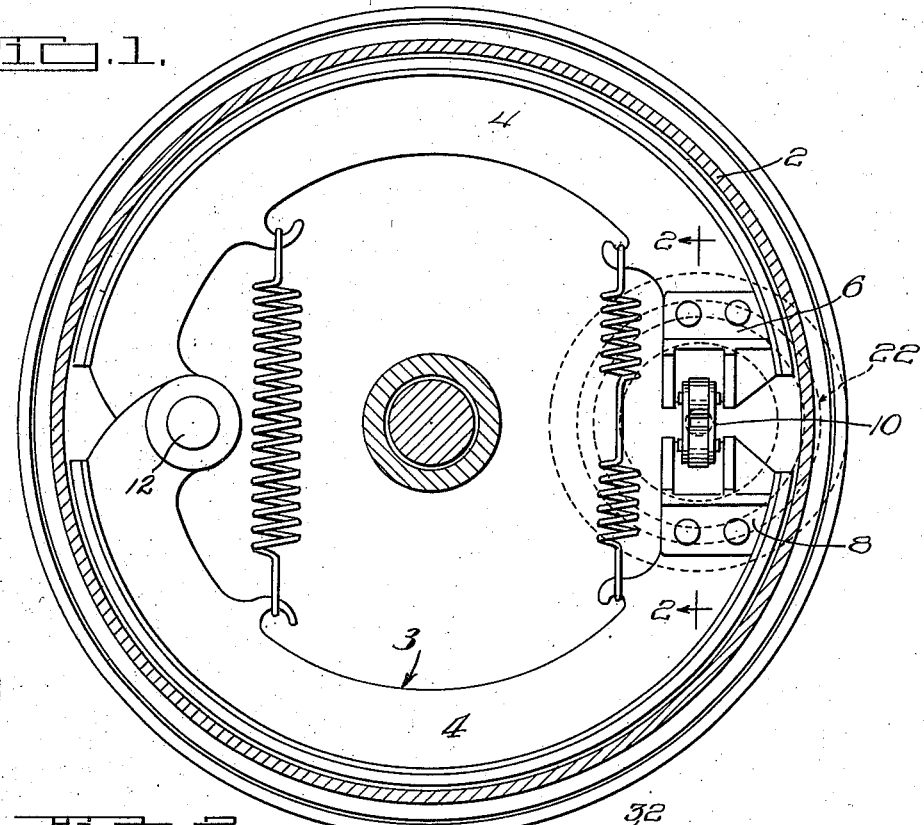
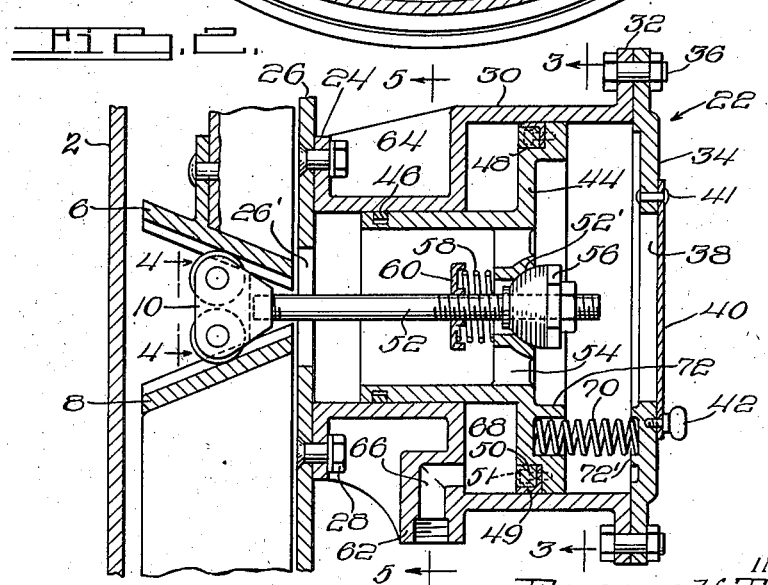
INVENTOR
Eugene V. Taylor
BY
[signature]
ATTORNEY Dec. 15, 1936. E. V. TAYLOR 2,064,575
BRAKE
Original Filed May 7, 1928 2 Sheets-Sheet 2
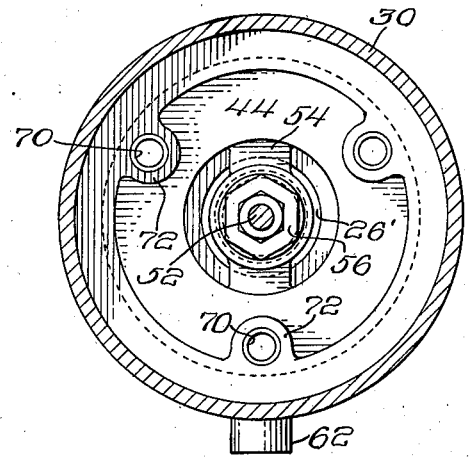
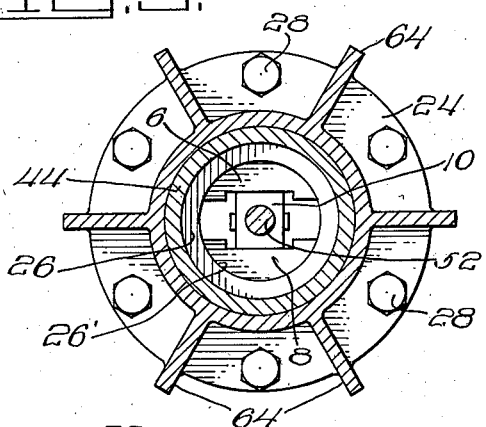
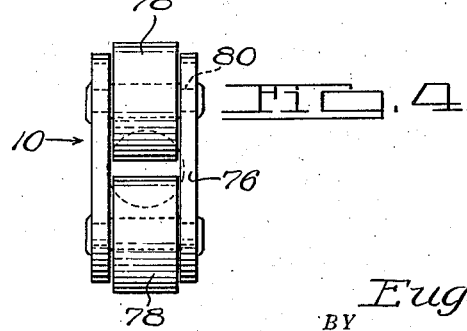
INVENTOR
Eugene V. Taylor
BY
ATTORNEY Patented Dec. 15, 1936

2,064,575

UNITED STATES PATENT OFFICE 2,064,575

BRAKE

Eugene V. Taylor, Chicago, Ill., assignor to Bendix Brake Company, South Bend, Ind., a corporation of Illinois Application May 7, 1928, Serial No. 275,671
Renewed January 28, 1935

12 Claims. (Cl. 188—152)

This invention relates to brakes and is illustrated as embodied in a brake of the hydraulic or fluid-operated type. An object of my invention is to provide a simple form of brake-operating cylinder preferably connected to an unsprung vehicle part such as a brake closure part, the piston or plunger connecting rod of which is universally movable and connected directly with a novel cam-operating structure for the retarding mechanism, said cam being preferably wedge-shaped. A self-centering cam is therefore contemplated and one which automatically, by its floating connection with the retarding mechanism, compensates for unequal resistance of the parts of the retarding structure, thereby insuring an equal distribution of pressure upon the respective ends thereof.

The important feature of the invention lies in the fluid motor employed to actuate the brake applying structure, the novelty thereof lying in its universally movable connecting rod or piston shaft. The piston furthermore is of a novel design preferably having a plurality of diameters and rendered demountable from the cylinder by a detachable end plate thereon, which plate is provided with a normally covered opening to render accessible the contents of the cylinder.

Another feature of my invention relates to the particularly novel combination of piston rod and brake shoe applying device, the two being connected in line with each other, the combined unit being substantially universally movable.

A further ancillary but important object of my invention relates to the novel friction applying device employed which is of wedged design preferably having a rolling friction contact with the retarding structure.

In the embodiment illustrated the cylinder is preferably detachably connected to the brake backing plate and is provided with a piston slidable in a reduced portion thereof. A full floating double roller wedge cam actuated by said piston is connected thereto by a shaft connected to said piston by means such as a ball nut seated therein, the nut being urged into contact with said piston by a tension spring interposed between the piston and a stop secured to the rod.

The advantages of the arrangements set forth, and various other features of novelty and desirable details of construction will be apparent from the following description of one illustrated embodiment shown in the accompanying drawings, in which:

Figure 1 is a view, partly in section and partly in elevation of a conventional type of multiple shoe brake structure, together with my novel operating cylinder and shoe-operating cam;

Figure 2 is a sectional view taken on line 2—2 of Figure 1 indicating the essential details of my invention;

Figure 3 is a section taken on the line 3—3 of Figure 2 looking in the direction of the arrows disclosing, partly in section and partly in elevation, details of the piston, cylinder, and piston rod connection;

Figure 4 is an enlarged end view of my novel cam; and

Figure 5 is a sectional view through the hydraulic operator taken on line 5—5 of Figure 2.

In the particular embodiment selected for illustration, 2 indicates a brake drum within which may be mounted friction means such as conventional multiple shoe brake structure, indicated generally by the reference character 3 and including a pair of shoes 4, the ends 6 and 8 of which preferably define a wedge and are adapted to be thrust laterally into operative engagement with the drum by my novel cam 10. The shoes 4 are pivotally mounted on an anchor 12 secured to a backing plate 26. It is to be understood, however, that my invention is not to be restricted to the type of retarding means disclosed, for it is obvious that it may be utilized equally well in any brake retarding means wherein any two surfaces are to be separated.

One feature of my invention is embodied in a novel operating cylinder, best shown in Figures 2 and 3 of the drawings, in which 22 denotes generally the cylinder preferably flanged at 24 and suitably attached to the backing plate 26 of the brake structure by bolts 28 or other fastening means. The cylinder is preferably enlarged at 30, and the end is flanged at 32 to support a detachable end plate 34 suitably attached thereto by means of fastenings such as bolts 36. Closure plate 34 is preferably provided with an opening 38 therein normally closed by a cover plate 40 pivotally mounted at 41 and fastened at 42 by suitable means such as a tap screw with handle or other latch means. Both detachable end plate 34 and its opening 38 afford a ready means for access to the interior of the novel cylinder to make replacements or repairs therein.

A piston or plunger 44, complemental in section with the cylinder structure is fitted for sliding contact therewith and may be provided at one of its ends with the conventional ring 46 and at its other end with a rabbeted or recessed portion 48 in which is preferably fitted a suitable packing such as a cupped leather washer 49 secured to the piston by locking ring 50, fastenings such as taps 51 passing through both ring and washer.

Of particular importance is the novel combination of cam 10 or other operating device and the piston 44. In the illustrated embodiment, 52 denotes a connecting rod having mounted at one end thereof my novel cam and rotatably connected at its other end to a central web 54 in the piston preferably located at one end thereof as disclosed. It is my intention that a universal connection between cam and piston be had and to that end the opening 26' in the closure plate 26 is made large enough for universal movement of the rod 52. Also in the attainment of this end I preferably mount a ball nut 56, or other attachment permitting universal movement, upon the end of the rod 52, said nut having a threaded or other adjustable engagement with the rod, the arrangement permitting of adjustment of the same with respect to the piston. It is also obvious that by this arrangement a ready means for adjustment of the cam structure is presented whereby play between the friction means and cam may be compensated for.

A tension spring 58 is preferably interposed between and abuts against the web 54 and a suitable stop 60 attached to the rod 52, said spring functioning to constantly retain the cylindrical face of the ball nut 56 in engagement with the correspondingly shaped recess 52' in the piston web.

Piston actuating fluid such as air, water or oil may be admitted through a boss 62 integrally or otherwise formed in the cylinder wall which is reinforced at said boss and at other spaced points about the cylinder by ribs 64. The actuating fluid such as air or oil passes through a suitable duct 66 to the chamber 68 impinging upon the piston wall forcing the same outwardly and rendering operable the brake applying means through the intermediary of the floating cam and connecting rod connected to the piston. Suitable return springs 70 are interposed between and abut against the detachable closure plate and piston wall, being housed at the piston abutting ends by rib projections 72 on the piston wall and by similar projections 72' on the closure plate. These springs function to return the piston with its connected cam to an inoperative position upon release of the fluid pressure.

A minor but nevertheless important feature relates to the novel cam 10 generally wedge shaped and preferably detachably mounted on the piston rod 52 at 74. The cam per se preferably comprises a wedge shaped clevis 76 having rollers 78 journaled in suitable bearings 80 in the ends thereof the rollers positioned between the furcations of the clevis. Longitudinal movement of the rod 52 effects a rolling friction contact between the cam and brake shoes or other retarding device to render the same operative.

It will thus be seen that I have provided a novel actuating cylinder having a direct connection by a substantially universally movable means with a novel wedge operating means for the retarding structure. An efficient fluid operator is thus provided coupling, by simple compact structure, a suitable fluid system with a conventional retarding device, no extensive or expensive changes being necessary in either brake or system.

While one illustrative embodiment of my invention has been described in detail, it is not my intention to limit its scope to that particular embodiment or otherwise than by the terms of the appended claims.

I claim:

1. A brake assembly comprising, in combination, a brake drum and backing plate therefor, retarding means for said drum, a floating cam for rendering said retarding means operative, a fluid-operated actuator connected to said backing plate comprising a relatively movable piston and connecting rod for rendering operative said cam means.

2. A brake comprising, in combination, retarding means, a fluid-power operator, and means for actuating the retarding means comprising a single connecting rod having connected at one end thereof a floating camming element, said rod having a universal connection with said operator at its other end.

3. A brake comprising, in combination, a brake drum and retarding means therefor within said drum, an operator for said retarding means, a backing plate provided with an opening therein, a fluid motor mounted on said plate and actuating means for said retarding means having a universal connection with said operator and passing through said opening.

4. A fluid-power cylinder comprising, in combination, an end face provided with relatively short inwardly extending curved ribs, a piston opposite said cylinder end and provided with correspondingly shaped ribs and tensioning means interposed between said piston and cylinder end and housed within said ribs.

5. A brake comprising, in combination, retarding means, a fluid power operator, an applying device for the retarding means having a freely floating portion disconnectedly engaging said retarding means and having a substantially universal connection with the operator, the axis of said applying device substantially coinciding with the operator axis.

6. A brake comprising, in combination, retarding means, a fluid power operator and a wedge-shaped applying device for the retarding means having a floating connection with said retarding means and having a substantially universal connection with the operator, the axis of said applying device substantially coinciding with the operator axis.

7. In an automotive vehicle a brake drum, retarding means acting upon said drum, a fluid operator including a piston, a tension rod connected at one end to said piston for universal movement, and a wedge freely floating and disconnectedly engaging said retarding means directly secured to the opposite end of said tension element.

8. A brake comprising in combination, a retarding means having oppositely inclined cam engaging ends and applying means therefor comprising a wedge shaped clevis, and rollers positioned between the faces thereof, one at each side and each adapted to engage one of the inclined ends of the retarding means.

9. A brake comprising in combination, a retarding means having oppositely inclined cam engaging ends, and applying means comprising a member interposed between said inclined ends in combination with a pair of rollers, one of which engages each of said inclined ends and by means of both of which thrust is transmitted from said member to said inclined ends.

10. A brake comprising in combination, a retarding means having oppositely inclined cam engaging ends, and applying means comprising a wedge shaped member interposed between said inclined ends in combination with a pair of rollers, one of which engages each of said inclined ends and by means of both of which thrust is transmitted from said member to said inclined ends.

11. A brake comprising in combination, a non-rotatable backing plate, a cylinder fixedly secured to the outside of said backing plate, a piston in said cylinder, a piston rod connected to said piston and extending through said backing plate, means for exerting pressure on said piston to exert tension on said piston rod, a rotatable brake drum, brake shoes within said drum mounted on said backing plate, anchorage means for preventing rotation of said shoes relative to said backing plate, and means for converting tension on said piston rod to spreading movement for said shoes whereby pressure exerted on said piston and exerting tension on said piston rod spreads said shoes into contact with the periphery of the rotating drum but tends to move the edges of said shoes away from contact with the rotating flat surface of said drum and thus tends to prevent contact between said edges and said flat surface.

12. A brake comprising in combination, a backing plate, a brake drum, brake shoes formed with inclined surfaces, a cylinder fixedly secured to the outside of the backing plate and formed with a stepped bore, a piston in said cylinder having a cylindrical sealing surface contacting with one portion of said bore and a second cylindrical sealing surface having a different diameter and contacting with another portion of said bore whereby an annular pressure chamber is formed in which fluid acts to move said piston away from said backing plate, and a piston rod connected to said piston and extending through the backing plate, movement of said piston acting through said piston rod as a tension force for spreading said shoes.

EUGENE V. TAYLOR.